United States Patent [19]

Mugglestone

[11] 4,306,365

[45] Dec. 22, 1981

[54] MEANS FOR FASTENING A LABEL TO AN ARTICLE

[75] Inventor: Peter R. Mugglestone, Ormond, Australia

[73] Assignee: W. A. Deutsher Proprietary Limited, Moorabbin, Australia

[21] Appl. No.: 171,069

[22] Filed: Jul. 22, 1980

[30] Foreign Application Priority Data

Jul. 27, 1979 [AU] Australia .................. PD9754

[51] Int. Cl.³ .................................. A44C 3/00
[52] U.S. Cl. ............................. 40/2 F; 40/20 R; 40/22
[58] Field of Search ............. 40/20, 2 R, 2 F, 22, 40/10 R

[56] References Cited

U.S. PATENT DOCUMENTS

| 1,495,853 | 5/1924 | Lane | 40/23 R |
| 1,570,400 | 1/1926 | Purinton | 40/2 F |
| 2,625,760 | 1/1953 | Cleal | 40/22 |
| 2,976,629 | 3/1961 | Briius | 40/310 |
| 3,952,438 | 4/1976 | Propst | 40/300 |

FOREIGN PATENT DOCUMENTS 369127 12/1906 France .................. 40/23

Primary Examiner—Gene Mancene
Assistant Examiner—Wenceslao J. Contreras
Attorney, Agent, or Firm—J. R. Halvorsen; T. W. Buckman

[57] ABSTRACT

A tag fastener assembly wherein the tag is locked to the fastener and wherein the fastener is provided with means by which it may be secured to an article such as the carcass of an animal.

6 Claims, 4 Drawing Figures

MEANS FOR FASTENING A LABEL TO AN ARTICLE

FIELD OF THE INVENTION

This invention relates to means for fastening a label to an article and it refers particularly but not exclusively to the fastening of an identifying label to a meat carcass such as a carcass of lamb, mutton or beef.

DESCRIPTION OF THE PRIOR ART

In recent years it has been found advantageous to label meat carcasses with the correct information required for full identification of the carcass. This is provided to ensure correct treatment, processing, handling, quality control, and transport. In the past, many labelling devices for meat carcasses have suffered from a number of disadvantages. Amongst those disadvantages are the ease with which they could be removed or dislodged, the ease with which the label could be damaged, the damage to the carcass by the attachment of the label, and possible attachment on a permanent basis of the label to the carcass.

SUMMARY OF THE INVENTION

An important object of this invention is to provide means for fastening a label to a meat carcass which will not have the disadvantages or defects hitherto encountered.

Another object is to provide a means for firmly or positively clamping a flexible label to a device having means providing for a positive attachment of the label to the carcass.

A further object is to provide means for attaching labels or the like to a carcass or the like which is simple to manufacture, may be easily and readily applied, which will clamp the label in place without damaging the label, and which is removable without significant damage to the carcass.

The invention devised with these and other objects in view provides a clamp having a body member, clamping means for engagement with the body member in such manner that an end of a flexible label may be gripped between the body member and the clamping means, and attachment means integral with the body member for engagement with an article such as a meat carcass whereby to hold the body member, and a label secured thereto, in positive engagement with said article.

In one form of the invention the body member has through it an opening in which the end of the label may be placed and the clamping means is a plug for insertion in that opening to firmly grip that end of the label.

In a further aspect of the invention the clamp has a body member, an opening in or through the body member for receiving an end part of a label, a plug for engagement in that opening so as to clamp said end part of the label in the body member, and spike means integral with the body member for engagement with the flesh of a meat carcass so as to hold the clamp in positive engagement with the carcass.

BRIEF DESCRIPTION OF THE DRAWINGS

In order that the invention may be readily understood and conveniently put into practical form we shall now describe a preferred embodiment of the invention with reference to the accompanying drawings, wherein.

DESCRIPTION OF THE PREFERRED EMBODIMENT

Figure 1:
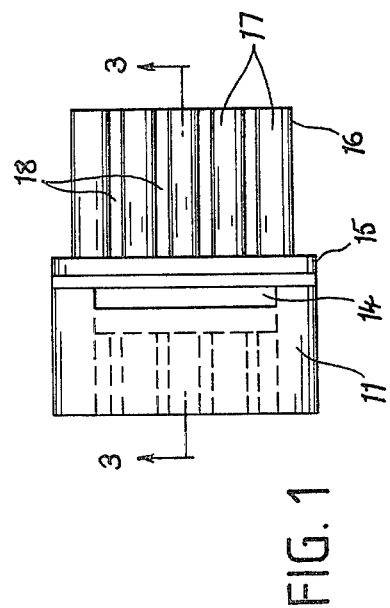
FIG. 1 is a plan view of a label-clamp of the invention.
Figure 4:
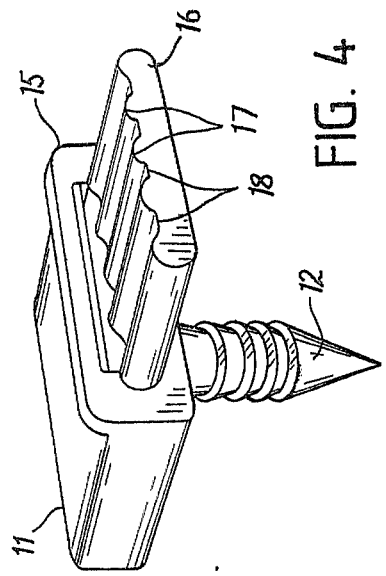
FIG. 4 illustrates the label-attachment means in perspective.
Figure 2:
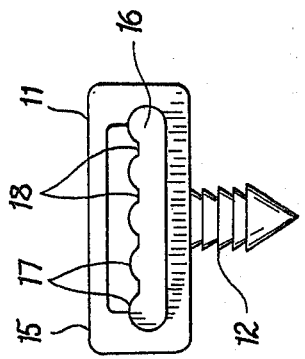
FIG. 2 is an end view of the label-clamp shown in FIG. 1.
Figure 3:
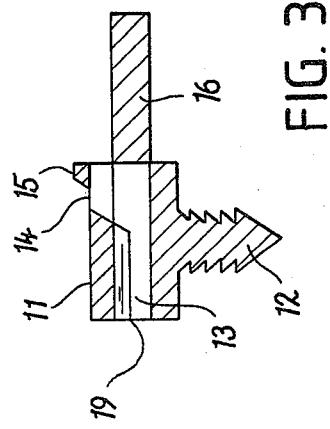
FIG. 3 shows a cross-section on the line and in the direction of the arrows 3—3 of FIG. 1.

Referring to the label attachment means illustrated in FIGS. 1 to 4, inclusive, the article has a body part 11 moulded of a suitable plastics material, such as acetal, having a unitary barbed stem 12 extending from its underside. Extending through the body 11 from front to back is a longitudinal opening or slot 13, and a transverse slot 14 extends through the top of the body 11 down to the slot 13. A unitary ridge 15 is provided across the top of the body 11 at the front thereof.

Formed integrally with the body 11 is a plug 16 having a number of curved humps 17 and troughs 18 in parallel arrangement. The upper surface 19 of the slot 13 is complementary in shape to receive the plug 16 when it is forced into the slot 13 to grip a label, and the space between the upper and lower surfaces of the slot 13 is such that when an end of a label is passed through the slot 14 into and through the slot 13, and the plug 16 is then pressed into the slot 13 (breaking the thin plastics material joining it to the body 11 in the process), the label end will be gripped tightly between the upper surface of the plug 16 and the upper surface 19 of said slot 13. When the plug 16 is so pressed into the body 11 it can be removed only with difficulty.

The label attachment means with the label attached may then be fastened to a meat carcass by pressing the barbed stem into an appropriate part of the carcass.

It is to be understood that modifications in details of design and construction may be made wihout departing from the ambit of the invention as defined by the appended claims.

I claim:

1. Means for fastening a label to an article, consisting of a clamp having a body member, an opening in or through the body member for receiving an end part of a label, said opening extending from front to back of the body member and a branch opening extends from the top of the body member and communicates with the first-mentioned opening, whereby the end of said label can be introduced into at least one of said openings, a complimentary plug for engagement in that opening so as to clamp said end part of the label in the body member, and retaining means integral with the body member for engagement with the flesh of a meat carcass so as to hold the clamp in positive engagement with the carcass.

2. Means for fastening a label to an article as claimed in claim 1, wherein the body member and the plug constitute a unitary moulding and the connection of the plug to the body member may be fractured by pressure forcing the plug into the opening.

3. Means for fastening a label to an article as claimed in claim 1, wherein a clamping surface of the plug is corrugated in the transverse direction and the complementary surface within the opening has complementary corrugations to be engaged by the corrugations of the plug when said plug is pressed into the opening.

4. Means for fastening a label to an article as claimed in claim 1 wherein said first mentioned opening has an enlarged portion adjacent the front of the body member, deflection means for guiding said label through said enlarged portion into the portion of said opening complementary to said plug.

5. Means for fastening a label to an article as claimed in claim 4 wherein said deflection means is formed by at least one wall of said branch opening.

6. Means for fastening a label to an article as claimed in claim 1 wherein said retaining means includes a spike-like stud extending integrally from said body member and having axially spaced shoulder means thereon for engagement with the flesh of a meat carcass.

* * * * *